(12) United States Patent
Chou et al.

(10) Patent No.: US 8,508,841 B2
(45) Date of Patent: Aug. 13, 2013

(54) LIGHT CONVERSION MODULE AND LIGHT SOURCE SYSTEM INCLUDING THE SAME

(75) Inventors: Ming Hsien Chou, Hsinchu (TW); Ying Hao Su, Hsinchu (TW)

(73) Assignee: HC Photonic Corp., Hsin-Chu (TW)

( * ) Notice: Subject to any disclaimer, the term of this patent is extended or adjusted under 35 U.S.C. 154(b) by 299 days.

(21) Appl. No.: 13/040,612

(22) Filed: Mar. 4, 2011

(65) Prior Publication Data

US 2012/0224252 A1    Sep. 6, 2012

(51) Int. Cl.
*G02F 1/37* (2006.01)
*G02F 1/35* (2006.01)

(52) U.S. Cl.
USPC .............................. 359/328; 359/329; 372/22

(58) Field of Classification Search
USPC .............................. 359/326–332; 372/21–22
See application file for complete search history.

(56) References Cited

U.S. PATENT DOCUMENTS

| 5,243,611 | A | * | 9/1993 | Hyuga et al. | 372/22 |
| 6,795,232 | B2 | * | 9/2004 | Fujiura et al. | 359/326 |
| 7,378,636 | B2 | * | 5/2008 | Wada et al. | 250/214 VT |
| 7,489,437 | B1 | | 2/2009 | Bauco et al. | |
| 7,760,773 | B2 | * | 7/2010 | Ma et al. | 372/21 |
| 7,961,378 | B2 | * | 6/2011 | Imai et al. | 359/326 |
| 8,066,385 | B2 | * | 11/2011 | Kobori et al. | 353/51 |
| 8,073,022 | B2 | * | 12/2011 | Furuya et al. | 372/21 |
| 2001/0010698 | A1 | | 8/2001 | Kraenert et al. | |

* cited by examiner

*Primary Examiner* — Daniel Petkovsek
(74) *Attorney, Agent, or Firm* — WPAT, P.C.; Anthony King

(57) ABSTRACT

A light conversion module includes a coupler for combining two light beams to form a combined light beam, a nonlinear crystal arranged to receive the combined light beam and configured to include a plurality of poling regions for performing successive nonlinear frequency mixing processes, a first optical device configured to focus the combined light beam onto the nonlinear crystal, a first moving stage carrying the nonlinear crystal and moving the nonlinear crystal for an adjustment of a focus position of the combined light beam on the nonlinear crystal, and an optical detector configured for measuring a power level of the light beam from the nonlinear crystal for the adjustment of the focus position of the combined light beam on the nonlinear crystal.

8 Claims, 5 Drawing Sheets

LIGHT CONVERSION MODULE AND LIGHT SOURCE SYSTEM INCLUDING THE SAME

BACKGROUND OF THE INVENTION

1. Field of the Invention

The present invention relates to a light source system, and relates more particularly to a light source system employing a nonlinear crystal.

2. Description of the Related Art

Existing lasers do not provide lights with wavelengths covering the entire desired optical spectrum. Nonlinear crystals can be coupled to existing lasers to double the frequency of a laser, to sum or subtract the frequencies of two different lasers to produce a third frequency, or to parametrically generate a new frequency. As such, lights with wavelengths other than those of lights from existing lasers can be generated.

The frequency conversion processes include second harmonic generation, sum frequency generation (SFG), and difference-frequency generation (DFG). In the process of second harmonic generation (SHG), an incident beam at frequency $\omega$ is converted to radiation at the second harmonic frequency $2\omega$. In the process of sum-frequency generation (SFG), light with a frequency that is the sum of two other frequencies is generated. In the process of difference-frequency generation, light with a frequency that is the difference between two other frequencies is generated.

An RGB laser radiation source for generating red, green, and blue light beams using the above frequency conversion processes is disclosed in U.S. patent application Ser. No. 09/775,208. As shown in FIG. 1, the RGB laser radiation source includes a first laser radiation source 1 emitting a first beam with a wavelength of 1064 nm, which is partially frequency-doubled by $SHG_1$ to generate green light with a wavelength of 532 nm and is partially directed to $SFM_1$. A second laser radiation source 2 produces a second beam with a wavelength of 1550 nm, which is partially supplied to the $SFM_1$ and mixed with the first beam to produce red light with a wavelength of 632 nm. $SHG_2$ receives a portion of the second beam to generate a beam with a wavelength of 780 nm, which mixes with a portion of the first beam. The two beams are then sum-frequency mixed by $SFM_2$ to generate blue light with a wavelength of 450 nm. The RGB laser radiation source uses several nonlinear crystals and two lasers to successfully generate red, green, and blue light beams. However, the design of such an RGB laser radiation source is complex and non-compact, and the adoption of too many nonlinear crystals may also increase the cost.

FIG. 2 shows another RGB source 10 disclosed in U.S. Pat. No. 7,489,437. The RGB source 10 has a wavelength conversion system 20 including a single NLO (nonlinear optical) unit 22 consisting of an optical parametric oscillator (OPO), which has a single periodically poled crystal 26 and is surrounded by input end-mirror 28I and output end-mirror 28O. A fiber-only laser 16 is used to provide light beam BN, which is converted by a non-linear optical process to generate red, green, and blue beams BR, BG, and BB. The OPO is usually configured to be singly resonant at an MIR idler wavelength. The input end-mirror 28I is antireflection (AR) coated at the wavelength of the light beam BN and high-reflection (HR) coated at red, green, blue, and MIR idler wavelengths. Likewise, the output end-mirror 28O is HR coated at the MIR idler wavelength and the wavelength of the light beam BN and is AR coated at red, green and blue wavelengths. The RGB source 10 needs to be built with high precision so that high conversion efficiency can be achieved. The RGB source 10 has a complex structure and is not easily built. In addition, the RGB source 10 uses expensive coated mirrors. Thus, it is expensive and not a suitable RGB source for consumer products.

SUMMARY OF THE INVENTION

One aspect of the present invention is to provide a system for producing light with a plurality of wavelengths, which has a capability of adjusting the focus of a light beam on a nonlinear crystal to achieve a maximum power output.

One aspect of the present invention is to provide a system, which can be coupled with two laser sources such that the system can provide an output light beam with a broad wavelength distribution.

In accordance with the above aspects, the present invention proposes a light conversion module. The light conversion module comprises a coupler, a nonlinear crystal, a first optical device, a first moving stage, and an optical detector. The coupler is for combining two light beams to form a combined light beam. The nonlinear crystal is arranged to receive the combined light beam and is configured to include a plurality of poling regions for performing successive nonlinear frequency mixing processes. The first optical device is configured to focus the combined light beam onto the nonlinear crystal. The first moving stage carries the nonlinear crystal and is configured for moving the nonlinear crystal for an adjustment of a focus position of the combined light beam on the nonlinear crystal. The optical detector is configured for measuring a power level of a light beam from the nonlinear crystal for the adjustment of the focus position of the combined light beam on the nonlinear crystal.

The present invention proposes a light source system, which comprises a first laser source, a second laser source, and the above-mentioned light conversion module. The first laser source produces a first light beam with a first near-infrared wavelength. The second laser source produces a second light beam with a second near-infrared wavelength. The coupler of the light conversion module combines the first and second light beams to form a combined light beam.

To better understand the above-described objectives, characteristics and advantages of the present invention, embodiments, with reference to the drawings, are provided for detailed explanations.

BRIEF DESCRIPTION OF THE DRAWINGS

The invention will be described according to the appended drawings in which.

DETAILED DESCRIPTION OF THE INVENTION

Figure 1:
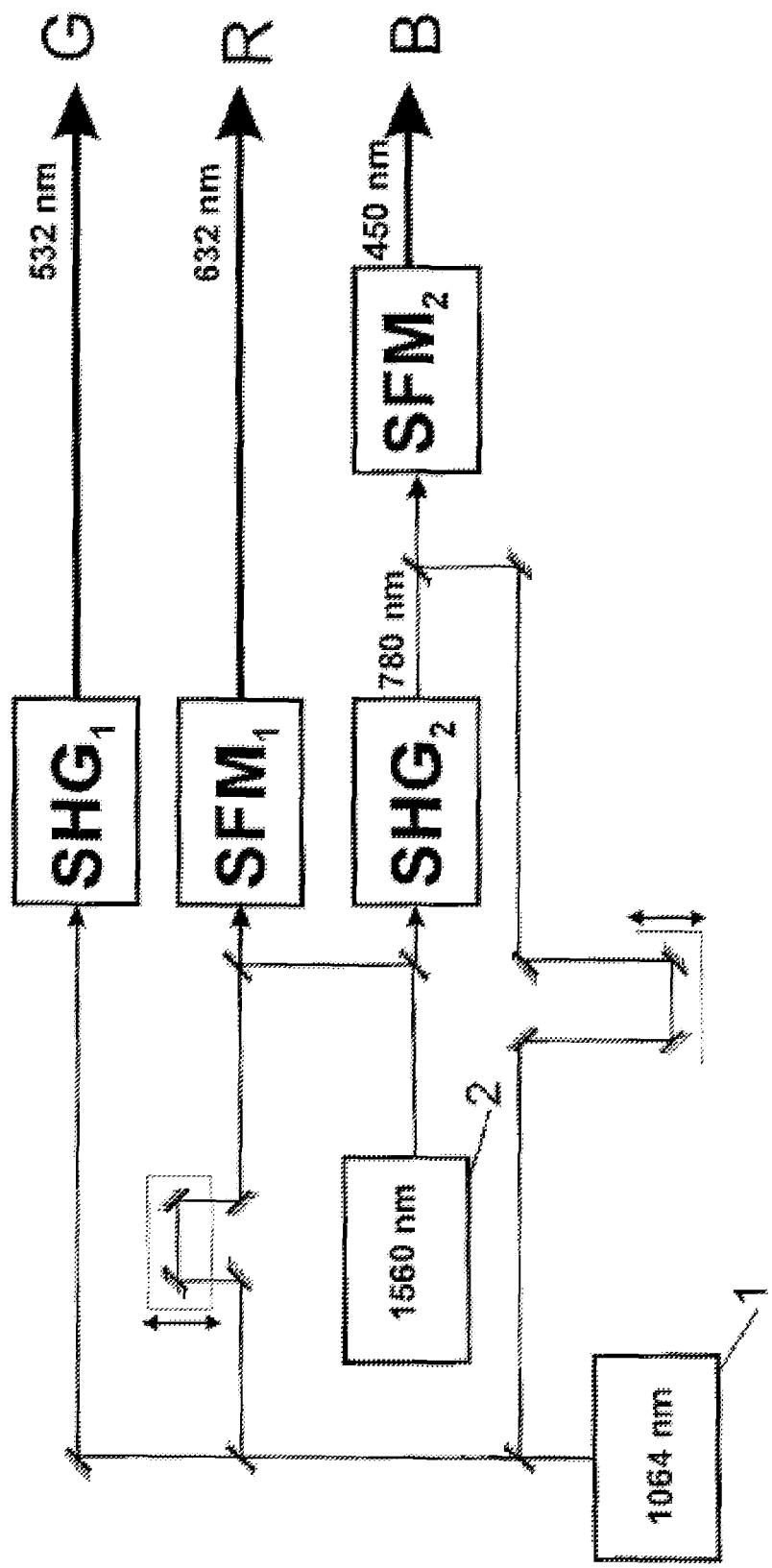
FIG. 1 shows a conventional RGB laser radiation source in the related art.
Figure 2:
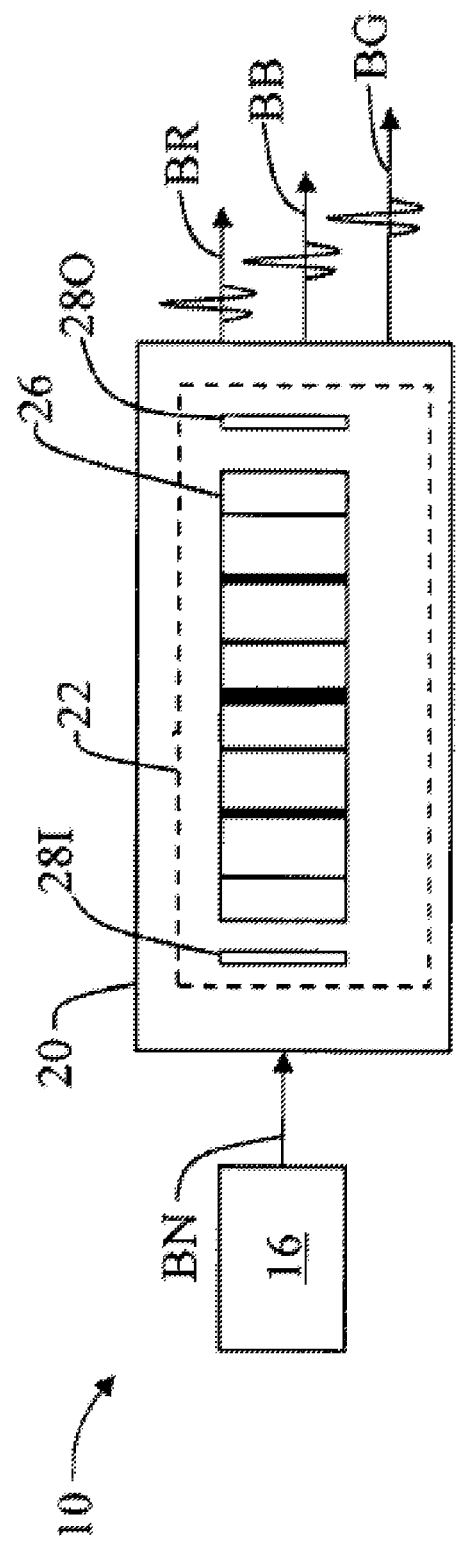
FIG. 2 shows another conventional RGB source in the related art.
Figure 3:
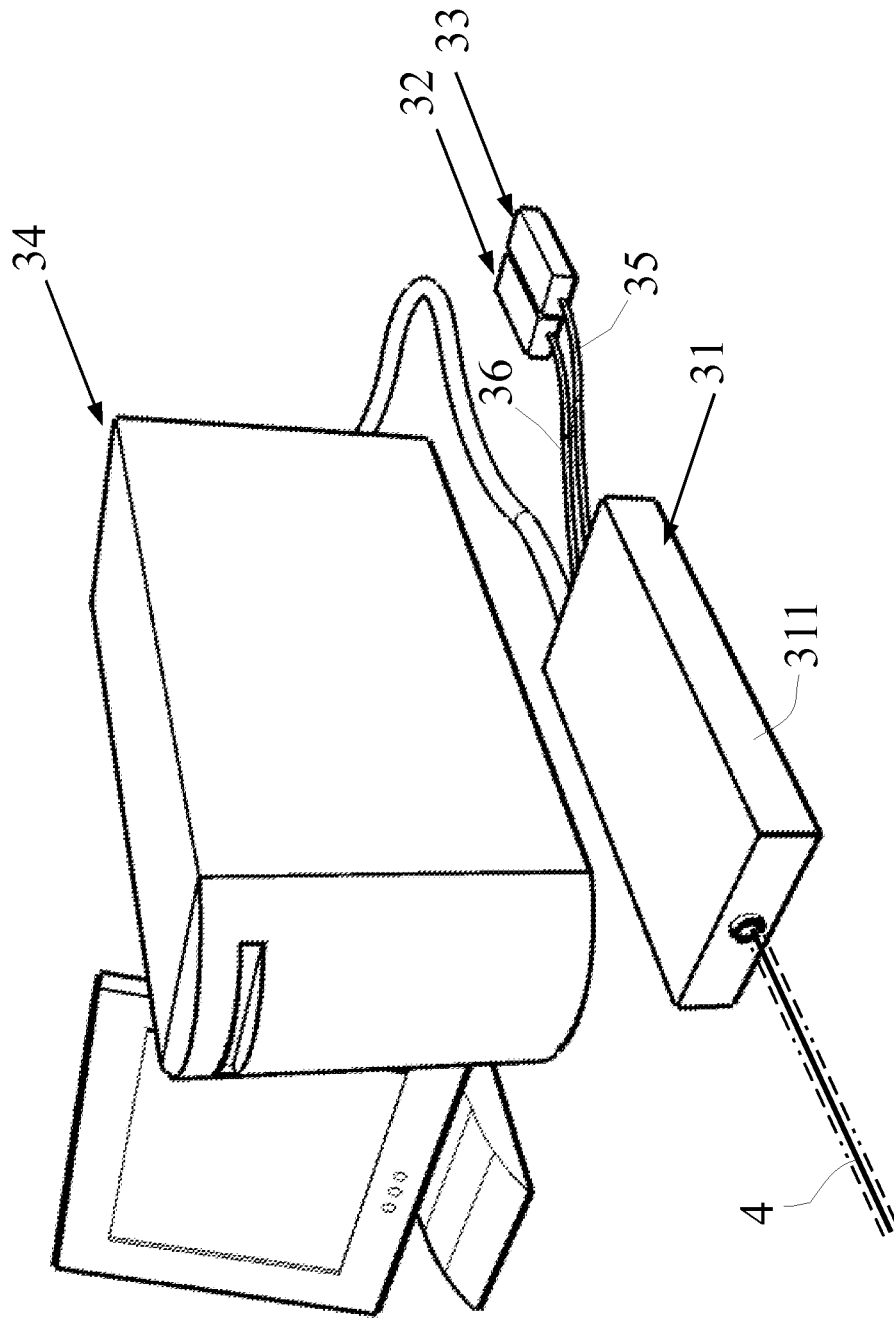
FIG. 3 is a perspective view showing a light source system for producing light with a plurality of wavelengths including red, green and blue wavelengths according to one embodiment of the present invention.

FIG. 3 is a perspective view showing a light source system 3 for producing light with a plurality of wavelengths including red, green and blue wavelengths according to one embodiment of the present invention. Referring to FIG. 3, the light source system 3 includes a light conversion module 31, two laser sources 32 and 33, and a processing device 34. The laser sources 32 and 33 supply two light beams transmitting through respective optical fibers 35 and 36 into the light conversion module 31, wherein the two light beams are frequency-mixed to generate a single light beam 4 including wavelengths ranging from 360 to 760 nm. The two laser sources 32 and 33 may emit light beams of different fundamental wavelengths, for example, in the infrared wavelength region. One of the laser sources 32 and 33 can be, for example, a mode-locked Nd:YAG solid-state laser emitting a light beam with a wavelength $\lambda_1$ of 1064 nm and having a pulse width of 4 ps at a pulse repetition frequency of 120 MHz. Another of the laser sources 32 and 33 can be a mode-locked Erbium-based fiber laser, may emit a light beam with a wavelength $\lambda_2$ of 1550 nm, and can have a pulse width of 4 ps at a pulse repetition frequency of 120 MHz.

Figure 4:
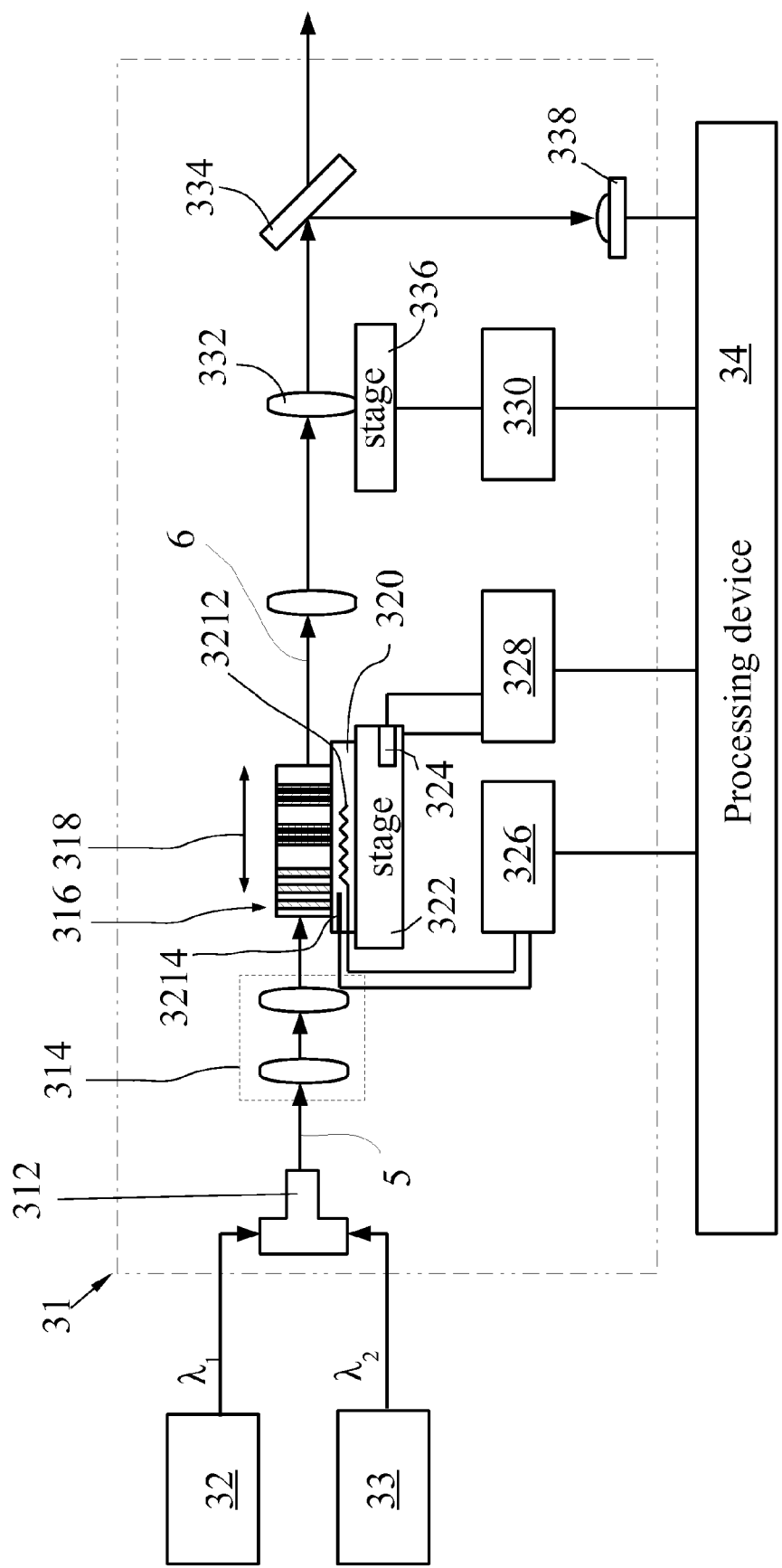
FIG. 4 illustrates the light conversion module of a light source system according to one embodiment of the present invention.

FIG. 4 illustrates the light conversion module 31 of a light source system 3 according to one embodiment of the present invention. Referring to FIGS. 3 and 4, two laser sources 32 and 33 are optically coupled to a coupler 312 for combining the light beams with different fundamental wavelengths from the two laser sources 32 and 33 to generate a combined light beam 5. A first optical device 314 having, for example, two lenses is optically coupled to the coupler 312, focusing the combined light beam 5 onto a nonlinear crystal 316 to achieve high conversion efficiency.

Figure 5:
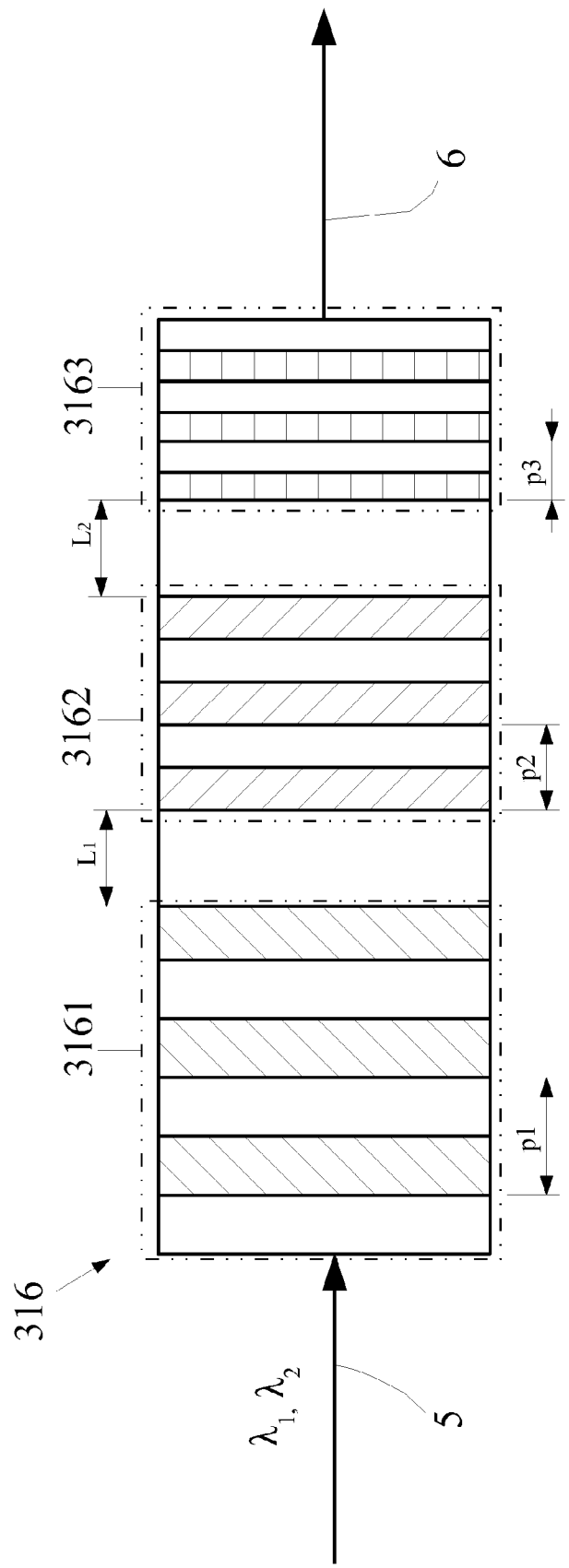
FIG. 5 is a view showing a nonlinear crystal according to one embodiment of the present invention.

FIG. 5 is a view showing a nonlinear crystal 316 according to one embodiment of the present invention. The nonlinear crystal 316 is configured to include a plurality of poling regions for performing successive nonlinear frequency mixing processes so as to provide a third light beam including at least three new wavelengths, for example, red, green and blue wavelengths. In one embodiment, the plurality of poling regions comprise a first poling region 3161 configured for performing a sum frequency generation (SFG) process, a second poling region 3162 for performing a second harmonic generation (SHG) process, and a third poling region 3163 configured for performing a sum frequency generation (SFG) process. The first, second, and third poling regions 3161-3163 can be arranged in a cascading manner. The first poling region 3161 is used to generate red light (with a wavelength of 630.9 nm) with a frequency that is the sum of the frequency of the light beam with a wavelength $\lambda_1$ of 1064 nm and the frequency of the light beam with a wavelength $\lambda_2$ of 1550 nm; the second poling region 3162 is used to double the frequency of the light beam with a wavelength $\lambda_1$ of 1064 nm to generate a green light with a wavelength of 532 nm; the third poling region 3163 is used to generate blue light (with a wavelength of 448.4 nm) with a frequency that is the sum of the frequency of the light beam with a wavelength $\lambda_2$ of 1550 nm and the frequency of the red light with a wavelength of 630.9 nm. Consequently, the light beam 6 from the nonlinear crystal 316 may include red, green, and blue light.

In one embodiment, the first poling region 3161 can have a poling spatial period p1 selected from a range of from 11 to 13 micrometers. The second poling region 3162 can have a poling spatial period p2 selected from a range of from 6 to 8 micrometers. The third poling region 3163 can have a poling spatial period p3 selected from a range of from 4 to 5 micrometers. In addition, the first, second, and third poling regions 3161 to 3163 can be separated from each other. The three poling regions 3161 to 3163 can be separated by an equal distance or by different distances. For example, the first poling region 3161 and the second poling region 3162 can be separated by a distance $L_1$ of approximately from 6 micrometers to 2 millimeters. The second poling region 3162 and the third poling region 3163 can be separated by a distance $L_2$ of approximately from 4 micrometers to 2 millimeters.

As shown in FIG. 4, the nonlinear crystal 316 is placed on a temperature-regulating member 320 for heating. The temperature-regulating member 320 may be, for example, a metal plate. The temperature-regulating member 320 can include a heating element 3212 and a temperature sensor 3214 for regulating the temperature of the temperature-regulating member 320. The temperature sensor 3214 and the heating element 3212 can be connected to a temperature controller 326 configured to regulate the temperature of the nonlinear crystal 316. As show in FIG. 3, the light conversion module 31 can include a housing 311 at least enclosing the heating element 3212 and the temperature sensor 3214, all of which constitute a regulated oven for containing the nonlinear crystal 316 and regulating the temperature of the nonlinear crystal 316.

In one embodiment, the temperature controller 326 can be electrically coupled to a processing device 34 to allow the temperature controller 326 to be externally controlled.

A first moving stage 322 is provided to carry the nonlinear crystal 316, configured to move relative to the focal point of the combined beam 5 along a direction indicated by 318. With the adjustment of the location of the first moving stage 322, the focal point of the combined beam 5 can be incident on a proper location so that maximum conversion efficiency can be achieved.

In one embodiment, a position sensor 324 can be disposed to sense the position of the first moving stage 322. The first moving stage 322 and the position sensor 324 can be electrically coupled to a stage controller 328. The position sensor 324 generates a position feedback signal to the stage controller 328, which supplies a control signal to the first moving stage 322 in accordance with the position feedback signal, driving the first moving stage 322 to a desired position.

Referring to FIG. 4 again, the light conversion module 31 may comprise a second optical device 332 for focusing the light beam 6 from the nonlinear crystal 316. The second optical device 332 can be carried by a stage 336 electrically coupled to a stage controller 330 and moving along the travel path of the light beam 6 for adjusting the focus point of the second optical device 332. The stage controller 330 can be electrically coupled to the processing device 34, which supplies control signals to the stage controller 330.

As shown in FIG. 4, in order to drive the stage 322 to a proper position to allow the maximum power level of the light beam 6 from the nonlinear crystal 316 to be achieved, an optical detector 338 is provided in the light conversion module 31 to measure the power level of the light beam 6, to which a required control signal is generated and supplied to the stage 322 in response. A splitting mirror 334 is used to split the light beam 6; a portion of light is directed to the optical detector 338 and another portion of light beam 6 transmits through the splitting mirror 334 to the exterior of the light conversion module 31. The optical detector 338 is electrically coupled to the processing device 34 configured for analyzing detected signals to determine where the stage 322 should move to so that the maximum power level of the light beam 6 can be obtained. In accordance with computing results, the processing device 34 sends a command to the stage controller 328, which drives the moving stage 322 to a desired position.

In one embodiment, the processing device 34 stores a predetermined power level. The processing device 34 compares a detected power level with the predetermined power level, determining the movement of the moving stage 322, and sends a command to the stage controller 328 to drive the moving stage 322 to the position where the power level of the light beam 6 is approximately equal to the predetermined power level.

In one embodiment, the light conversion module 31 may further comprise a communication port (not shown) disposed on the housing 311 for connecting the light conversion module 31 and the processing device 34. The communication port may be one of a serial COM port, a parallel port, a USB port, a Firewire port, a TCP/IP port, and a TCP/IP socket. With the establishment of the communication port, the processing device 34 can be independent from the light conversion module 31. In addition, the independent processing device 34 can further include a plug-and-play circuit such that the processing device 34 can detect the connection of the communication port with the processing device 34, automatically loading necessary drivers.

The light conversion module 31 is simple and uses fewer components. All components can be contained in the housing 311, shown as enclosed by a dashed line box in FIGS. 3 and 4. Thus, the light conversion module 31 can be very compact and suitable for portable consumer products. The light conversion module 31 does not need to be built with high precision. In addition, the light conversion module 31 is capable of automatically adjusting the power level of the emitted light beam to the optimum power level.

The above-described embodiments of the present invention are intended to be illustrative only. Numerous alternative embodiments may be devised by persons skilled in the art without departing from the scope of the following claims.

What is claimed is:

1. A light conversion module, comprising:
   a coupler combining two light beams to form a combined light beam;
   a nonlinear crystal arranged to receive the combined light beam, configured to include a plurality of poling regions for performing successive nonlinear frequency mixing processes;
   a first optical device configured to focus the combined light beam onto the nonlinear crystal;
   a first moving stage carrying the nonlinear crystal and configured for moving the nonlinear crystal for an adjustment of a focus position of the combined light beam on the nonlinear crystal;
   an optical detector configured for measuring a power level of a light beam from the nonlinear crystal for the adjustment of the focus position of the combined light beam on the nonlinear crystal;
   a splitting mirror for directing a portion of the light beam to the optical detector;
   a second optical device for focusing the light beam from the nonlinear crystal and a second moving stage carrying the second optical device for adjusting a focus point of the second optical device;
   a heating element for heating the nonlinear crystal;
   a temperature sensor adjacent to the nonlinear crystal for controlling the temperature of the nonlinear crystal; and
   a position sensor for sensing a position of the first moving stage;
   wherein the nonlinear crystal comprises a first poling region for a sum frequency generation process, a second poling region for a second harmonic generation process, and a third poling region for a sum frequency generation process, wherein the first, second, and third poling regions are arranged in a cascading manner.

2. The light conversion module of claim 1, wherein the first poling region includes a poling spatial period in a range of from 11 to 13 micrometers, the second poling region includes a poling spatial period in a range of from 6 to 8 micrometers, and the third poling region includes a poling spatial period in a range of from 4 to 5 micrometers.

3. The light conversion module of claim 1, wherein the first and second poling regions are separated by a distance of 6 micrometers to 2 millimeters, and the second and third poling regions are separated by a distance of from 4 micrometers to 2 millimeters.

4. The light conversion module of claim 1, further comprising a housing containing at least the nonlinear crystal and a communication port disposed on the housing.

5. A light source system, comprising:
   a first laser source producing a first light beam with a first near-infrared wavelength;
   a second laser source producing a second light beam with a second near-infrared wavelength; and
   a light conversion module comprising:
      a coupler combining the first and second light beams to form a combined light beam;
      a nonlinear crystal arranged to receive the combined light beam, configured to include a plurality of poling regions for performing successive nonlinear frequency mixing processes to provide a light beam including red, green, and blue wavelengths;
      a first optical device configured to focus the combined light beam onto the nonlinear crystal;
      a first moving stage carrying the nonlinear crystal and configured for moving the nonlinear crystal for an adjustment of a focus position of the combined light beam on the nonlinear crystal;
      an optical detector configured for measuring a power level of a light beam from the nonlinear crystal for the adjustment of the focus position of the combined light beam on the nonlinear crystal;
      a splitting mirror for directing a portion of the light beam from the nonlinear crystal to the optical detector;
      a second optical device for focusing the light beam from the nonlinear crystal and a second moving stage carrying the second optical device for adjusting a focus point of the second optical device;
      a heating element heating the nonlinear crystal;
      a temperature sensor adjacent to the nonlinear crystal for controlling the temperature of the nonlinear crystal; and
      a position sensor for sensing a position of the first moving stage;
      wherein the nonlinear crystal comprises a first poling region for a sum frequency generation process, a second poling region for a second harmonic generation process, and a third poling region for a sum frequency generation process, wherein the first, second, and third poling regions are arranged in a cascading manner.

6. The light source system of claim 5, wherein the first poling region includes a poling spatial period in a range of from 11 to 13 micrometers, the second poling region includes a poling spatial period in a range of from 6 to 8 micrometers, and the third poling region includes a poling spatial period in a range of from 4 to 5 micrometers.

7. The light source system of claim 5, wherein the first and second poling regions are separated by a distance of 6 micrometers to 2 millimeters, and the second and third poling regions are separated by a distance of from 4 micrometers to 2 millimeters.

8. The light source system of claim 5, further comprising a processing device storing a predetermined power level and configured to compare the power level of the light beam from the nonlinear crystal and the predetermined power level.

* * * * *